(No Model.)

R. R. MOORE.
TRACTION WHEEL.

No. 352,483. Patented Nov. 9, 1886.

Witnesses,
Geo. H. Strong
J. H. Nourse

Inventor,
Rufus R. Moore
By Dewey & Co.
attys

UNITED STATES PATENT OFFICE.

RUFUS R. MOORE, OF MODESTA, CALIFORNIA.

TRACTION-WHEEL.

SPECIFICATION forming part of Letters Patent No. 352,483, dated November 9, 1886.

Application filed April 19, 1886. Serial No. 199,422. (No model.)

*To all whom it may concern:*

Be it known that I, RUFUS R. MOORE, of Modesta, Stanislaus county, State of California, have invented an Improvement in Traction-Wheels; and I hereby declare the following to be a full, clear, and exact description of the same.

My invention relates to certain improvements in traction-wheels, and it is more especially applicable to the wheels of that class which are employed upon traveling thrashing-machines or other apparatus having machinery which must be set in motion by connection with the bearing and traction wheels, and in which it is desirable to give the wheels as strong a hold as possible upon the surface over which they travel.

It consists of a broad rim having flanges secured around its circumference like rings projecting outwardly from the rim in planes between the center and edges of the rim. Transverse ribs extend between these flanges and are riveted to them and also to the rim or surface of the wheel.

Figure 1:
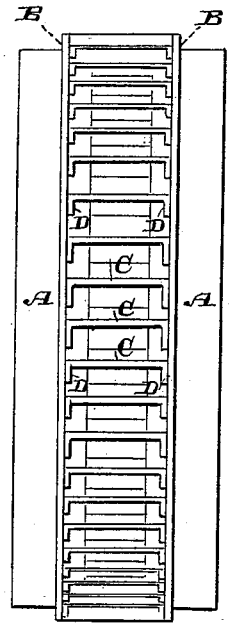
Figures 2, 3:
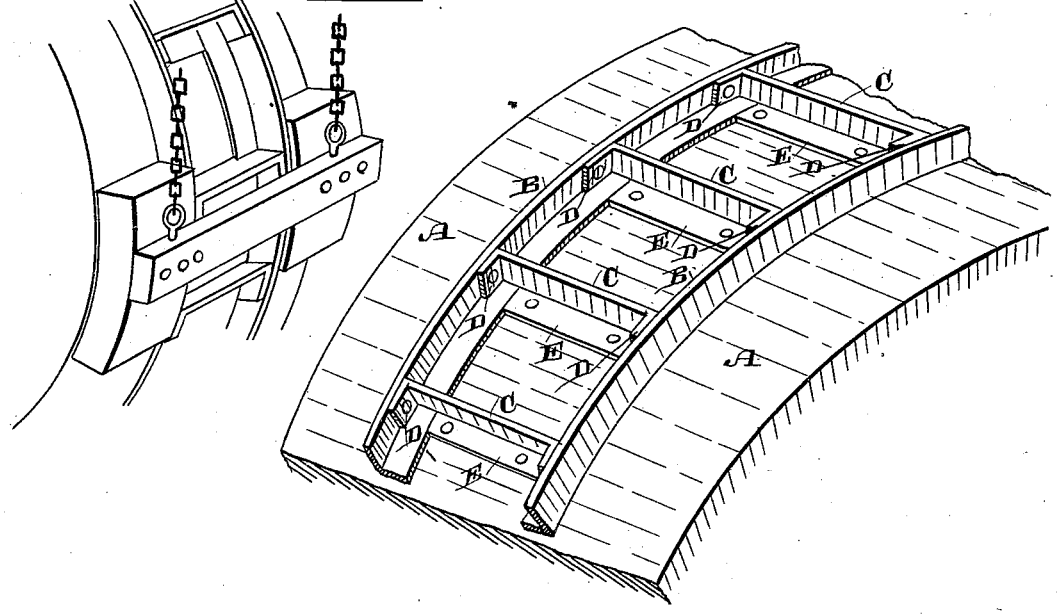

Referring to the accompanying drawings for a more complete explanation of my invention, Figure 1 is a view or elevation of the wheel. Fig. 2 is an enlarged perspective view of a section of the rim. Fig. 3 is a view of the brake as applied to the wheel.

A is the rim of the wheel, which may be made of wood, metal, or any other suitable material. In the present case I have shown it as made of heavy plate-iron, and of considerable breadth or face, so as to have a wide surface to rest upon the ground to support the weight of the superincumbent apparatus when the ground is sandy or soft.

B B are flanges made, preferably, of angle-iron, and curved so as to surround the rim upon which they fit, one of the angular flanges of each being bolted to the rim, while the other one projects in a plane outwardly from it. These two rims B are separated by a considerable space, and are also secured to the wheel-rim A at a considerable distance from its edges. Between the projecting rims of the flanges B B are transverse angle-plates C, having their ends turned, as shown at D, so as to be bolted inside of the flanges B, while the angular portion E, which rests upon the surface of the rim, is also riveted or bolted to it. By this construction the projecting flanges B B are strongly braced and united together, and the whole is strongly united to the rim of the wheel, serving to re-enforce or strengthen the rim and prevent its being bent or indented upon rough or hard ground.

The rims or flanges B project outwardly from the rim A, and will travel smoothly upon the surface of hard ground, thus preventing the jolting and vibration which would occur if the wheel were provided with transverse or other ribs or corrugations without the rims. When the machine travels in sandy or yielding soil, these flanges B and the transverse ribs C will sink into it, so that the weight of the machine is supported upon the rim A, while the ribs C then act to hold the wheel and prevent its slipping on the ground. This effect is rendered much more complete by reason of the flanges B upon each side, which hold the soil inclosed between themselves and the ribs C, and prevent it from being forced out on either side when the strain of traction is brought upon the periphery of the wheel. At the same time a wheel constructed in this way presents a smooth surface upon each side of the tractile portion, so that the brake may be easily applied to the smooth faces of the wheel-rim, and the smooth outside faces of the flanges B will serve as a guide and prevent the brake becoming broken or damaged by contact with the transverse ribs or corrugations.

Having thus described my invention, what I claim as new, and desire to secure by Letters Patent, is—

1. A traction-wheel having rims or flanges projecting outwardly from the surface of the rim, in combination with transverse bars extending between the flanges and bolted to them and the rim, substantially as herein described.

2. The angle-iron plates fitted and secured to the exterior wheel-rim so as to form projecting flanges, in combination with transverse angle-ribs extending between the flanges, bolted to the wheel-rim, having their ends bent at right angles, and bolted to the flanges, substantially as herein described.

3. A wheel having the outer portions or edges of the rim formed with a smooth surface, and the central portion with corrugations or ribs, in combination with a brake having blocks fitting the smooth portions of the rim at each side of the center and guided by the central flanges.

In witness whereof I have hereunto set my hand.

RUFUS R. MOORE.

Witnesses:
S. H. NOURSE,
H. C. LEE.